(12) United States Patent
Zhou et al.

(10) Patent No.: US 8,027,593 B2
(45) Date of Patent: Sep. 27, 2011

(54) SLOW CHIRP COMPENSATION FOR ENHANCED SIGNAL BANDWIDTH AND TRANSMISSION PERFORMANCES IN DIRECTLY MODULATED LASERS

(75) Inventors: Jianying Zhou, Acton, MA (US); Xueyan Zheng, Andover, MA (US); Kevin J. McCallion, Charlestown, MA (US); Daniel Mahgerefteh, Palo Alto, MA (US); Hongmin Chen, Waltham, MA (US); Guoxi Sun, Woburn, MA (US); Parviz Tayebati, Boston, MA (US)

(73) Assignee: Finisar Corporation, Sunnyvale, CA (US)

( * ) Notice: Subject to any disclaimer, the term of this patent is extended or adjusted under 35 U.S.C. 154(b) by 840 days.

(21) Appl. No.: 12/028,678

(22) Filed: Feb. 8, 2008

(65) Prior Publication Data

US 2008/0193144 A1 Aug. 14, 2008

Related U.S. Application Data

(60) Provisional application No. 60/900,386, filed on Feb. 8, 2007.

(51) Int. Cl.
*H04B 10/12* (2006.01)

(52) U.S. Cl. ........ 398/193; 398/185; 398/192; 398/194; 398/195; 398/196; 398/197; 398/198; 398/199

(58) Field of Classification Search .................. None
See application file for complete search history.

(56) References Cited

U.S. PATENT DOCUMENTS

| | | | |
|---|---|---|---|
| 3,324,295 A | 6/1967 | Harris | |
| 3,973,216 A | 8/1976 | Hughes et al. | |
| 3,999,105 A | 12/1976 | Archey et al. | |
| 4,038,600 A | 7/1977 | Thomas et al. | |
| 4,561,119 A | 12/1985 | Epworth | |
| 4,671,604 A | 6/1987 | Soref | |
| 4,754,459 A | 6/1988 | Westbrook | |
| 4,805,235 A | 2/1989 | Henmi | |
| 4,841,519 A | 6/1989 | Nishio | |

(Continued)

FOREIGN PATENT DOCUMENTS

CN 1236891 12/1999

(Continued)

OTHER PUBLICATIONS

CN 200580012705.4, Mar. 29, 2010, Office Action.

(Continued)

*Primary Examiner* — Ken N Vanderpuye
*Assistant Examiner* — Darren E Wolf
(74) *Attorney, Agent, or Firm* — Maschoff Gilmore & Israelsen

(57) ABSTRACT

The frequency chirp modulation response of a directly modulated laser is described using a small signal model that depends on slow chirp amplitude s and slow chirp time constant $\tau_s$. The small signal model can be used to derive an inverse response for designing slow chirp compensation means. Slow chirp compensation means include electrical compensation, optical compensation, or both. Slow chirp electrical compensation can be implemented with an LR filter or other RF circuit coupled to a direct modulation source (e.g., a laser driver) and the directly modulated laser. Slow chirp optical compensation can be implemented with an optical spectrum reshaper having a rounded top and relatively large slope (e.g., 1.5-3 dB/GHz). The inverse response can be designed to under-compensate, to produce a flat response, or to over-compensate.

19 Claims, 8 Drawing Sheets

U.S. PATENT DOCUMENTS

| | | |
|---|---|---|
| 4,896,325 A | 1/1990 | Coldren |
| 4,908,883 A | 3/1990 | Chraplyvy et al. |
| 4,914,667 A | 4/1990 | Blonder et al. |
| 5,088,097 A | 2/1992 | Ono et al. |
| 5,119,393 A | 6/1992 | Oka et al. |
| 5,136,598 A | 8/1992 | Weller et al. |
| 5,170,402 A | 12/1992 | Ogita et al. |
| 5,177,630 A | 1/1993 | Goutzoulis et al. |
| 5,293,545 A | 3/1994 | Huber |
| 5,325,378 A | 6/1994 | Zorabedian |
| 5,325,382 A | 6/1994 | Emura et al. |
| 5,371,625 A | 12/1994 | Wedding et al. |
| 5,394,429 A | 2/1995 | Yamada et al. |
| 5,412,474 A | 5/1995 | Reasenberg |
| 5,416,629 A | 5/1995 | Huber |
| 5,434,693 A | 7/1995 | Tanaka et al. |
| 5,450,432 A | 9/1995 | Okuda |
| 5,459,799 A | 10/1995 | Weber |
| 5,465,264 A | 11/1995 | Buhler et al. |
| 5,477,368 A | 12/1995 | Eskildsen et al. |
| 5,550,667 A | 8/1996 | Krimmel et al. |
| 5,568,311 A | 10/1996 | Matsumoto |
| 5,592,327 A | 1/1997 | Gabl et al. |
| 5,642,371 A | 6/1997 | Tohyama et al. |
| 5,696,859 A | 12/1997 | Onaka et al. |
| 5,737,104 A | 4/1998 | Lee et al. |
| 5,777,773 A | 7/1998 | Epworth et al. |
| 5,805,235 A | 9/1998 | Bedard |
| 5,856,980 A | 1/1999 | Doyle et al. |
| 5,920,416 A | 7/1999 | Beylat et al. |
| 5,946,129 A | 8/1999 | Xu et al. |
| 5,953,139 A | 9/1999 | Nemecek et al. |
| 5,953,361 A | 9/1999 | Borchert |
| 5,974,209 A | 10/1999 | Cho et al. |
| 5,991,323 A | 11/1999 | Adams et al. |
| 6,018,275 A | 1/2000 | Perrett et al. |
| 6,081,361 A | 6/2000 | Adams et al. |
| 6,088,373 A | 7/2000 | Hakki |
| 6,091,743 A | 7/2000 | Yang |
| 6,096,496 A | 8/2000 | Frankel |
| 6,104,851 A | 8/2000 | Mahgerefteh |
| 6,115,403 A | 9/2000 | Brenner et al. |
| 6,148,017 A | 11/2000 | Borchert et al. |
| 6,157,025 A | 12/2000 | Katagiri et al. |
| 6,188,499 B1 | 2/2001 | Majima |
| 6,222,861 B1 | 4/2001 | Kuo et al. |
| 6,271,959 B1 | 8/2001 | Kim et al. |
| 6,282,003 B1 | 8/2001 | Logan et al. |
| 6,298,186 B1 | 10/2001 | He |
| 6,331,991 B1 | 12/2001 | Mahgerefteh |
| 6,351,585 B1 | 2/2002 | Amundson et al. |
| 6,359,716 B1 | 3/2002 | Taylor |
| 6,353,623 B1 | 5/2002 | Munks |
| 6,421,151 B1 | 7/2002 | Berger |
| 6,459,518 B1 | 10/2002 | Suzuki et al. |
| 6,473,214 B1 | 10/2002 | Roberts et al. |
| 6,486,440 B1 | 11/2002 | Crafts et al. |
| 6,506,342 B1 | 1/2003 | Frankel |
| 6,522,809 B1 | 2/2003 | Takabayashi et al. |
| 6,563,623 B1 | 5/2003 | Penninckx et al. |
| 6,577,013 B1 | 6/2003 | Glenn et al. |
| 6,580,739 B1 | 6/2003 | Coldren |
| 6,618,513 B2 | 9/2003 | Evankow, Jr. |
| 6,628,690 B1 | 9/2003 | Fish et al. |
| 6,650,667 B2 | 11/2003 | Nasu et al. |
| 6,654,564 B1 | 11/2003 | Colbourne et al. |
| 6,658,031 B2 | 12/2003 | Tuganov et al. |
| 6,665,351 B2 | 12/2003 | Hedberg et al. |
| 6,687,278 B1 | 2/2004 | Mason et al. |
| 6,690,686 B2 | 2/2004 | Delfyett |
| 6,738,398 B2 | 5/2004 | Hirata |
| 6,748,133 B2 | 6/2004 | Liu et al. |
| 6,778,307 B2 | 8/2004 | Clark |
| 6,785,308 B2 | 8/2004 | Dyer et al. |
| 6,807,215 B2 | 10/2004 | Lam et al. |
| 6,810,047 B2 | 10/2004 | Oh et al. |
| 6,815,786 B2 | 11/2004 | Ogasawara et al. |
| 6,834,134 B2 | 12/2004 | Brennan et al. |
| 6,836,487 B1 | 12/2004 | Farmer et al. |
| 6,847,758 B1 | 1/2005 | Watanabe |
| 6,943,951 B2 | 9/2005 | Kikuchi et al. |
| 6,947,206 B2 | 9/2005 | Tsadka et al. |
| 6,963,685 B2 * | 11/2005 | Mahgerefteh et al. ......... 385/37 |
| 7,013,090 B2 | 3/2006 | Adachi et al. |
| 7,027,470 B2 | 4/2006 | May |
| 7,054,538 B2 | 5/2006 | Mahgerefteh et al. |
| 7,073,956 B1 | 7/2006 | Shin et al. |
| 7,076,170 B2 | 7/2006 | Choa |
| 7,123,846 B2 | 10/2006 | Tateyama et al. |
| 7,164,865 B2 | 1/2007 | Tatsuno et al. |
| 7,187,821 B2 | 3/2007 | Matsui et al. |
| 7,263,291 B2 | 8/2007 | Mahgerefteh et al. |
| 7,280,721 B2 | 10/2007 | McCallion et al. |
| 7,352,968 B2 | 4/2008 | Tayebati |
| 7,356,264 B2 | 4/2008 | Mahgerefteh et al. |
| 7,376,352 B2 | 5/2008 | Tayebati |
| 7,406,266 B2 | 7/2008 | Mahgerefteh et al. |
| 7,406,267 B2 | 7/2008 | Johnson et al. |
| 7,433,605 B2 | 10/2008 | Mahgerefteh et al. |
| 7,474,858 B2 | 1/2009 | Lee et al. |
| 7,474,859 B2 | 1/2009 | Mahgerefteh et al. |
| 7,477,851 B2 | 1/2009 | Mahgerefteh et al. |
| 7,480,464 B2 | 1/2009 | McCallion et al. |
| 7,492,976 B2 | 2/2009 | Mahgerefteh et al. |
| 7,502,532 B2 | 3/2009 | McCallion et al. |
| 7,505,694 B2 | 3/2009 | Johnson et al. |
| 7,515,626 B2 | 4/2009 | Lee et al. |
| 7,536,113 B2 | 5/2009 | Matsui et al. |
| 7,542,683 B2 | 6/2009 | Matsui et al. |
| 7,555,225 B2 | 6/2009 | Mahgerefteh et al. |
| 7,558,488 B2 | 7/2009 | Matsui et al. |
| 7,564,889 B2 | 7/2009 | Matsui et al. |
| 7,609,977 B2 | 10/2009 | Matsui et al. |
| 7,613,401 B2 | 11/2009 | Matsui et al. |
| 7,616,902 B2 | 11/2009 | Mahgerefteh et al. |
| 7,630,425 B2 | 12/2009 | Tayebati et al. |
| 7,639,955 B2 | 12/2009 | Zheng et al. |
| 7,657,179 B2 | 2/2010 | Mahgerefteh et al. |
| 7,663,762 B2 | 2/2010 | Mahgerefteh et al. |
| 7,697,186 B2 | 4/2010 | McCallion et al. |
| 7,697,847 B2 | 4/2010 | Matsui et al. |
| 7,742,542 B2 | 6/2010 | Mahgerefteh et al. |
| 7,760,777 B2 | 7/2010 | Matsui et al. |
| 7,778,295 B2 | 8/2010 | Matsui et al. |
| 7,809,280 B2 | 10/2010 | Mahgerefteh et al. |
| 7,860,404 B2 | 12/2010 | Matsui et al. |
| 2001/0012430 A1 | 8/2001 | Usami et al. |
| 2001/0048705 A1 | 12/2001 | Kitaoka et al. |
| 2002/0012369 A1 | 1/2002 | Nasu et al. |
| 2002/0044738 A1 | 4/2002 | Jablonski |
| 2002/0048290 A1 | 4/2002 | Tanaka et al. |
| 2002/0063930 A1 | 5/2002 | Blauvelt |
| 2002/0131047 A1 | 9/2002 | Zarrabian et al. |
| 2002/0154372 A1 | 10/2002 | Chung et al. |
| 2002/0159490 A1 | 10/2002 | Karwacki |
| 2002/0176659 A1 | 11/2002 | Lei et al. |
| 2003/0002099 A1 | 1/2003 | Sayyah et al. |
| 2003/0002120 A1 | 1/2003 | Choa |
| 2003/0063647 A1 | 4/2003 | Yoshida et al. |
| 2003/0067952 A1 | 4/2003 | Tsukiji et al. |
| 2003/0077031 A1 | 4/2003 | Zhang et al. |
| 2003/0099018 A1 | 5/2003 | Singh et al. |
| 2003/0147114 A1 | 8/2003 | Kang et al. |
| 2003/0161370 A1 | 8/2003 | Buimovich et al. |
| 2003/0169787 A1 | 9/2003 | Vurgaftman et al. |
| 2003/0193974 A1 | 10/2003 | Frankel et al. |
| 2003/0210912 A1 | 11/2003 | Leuthold |
| 2004/0008933 A1 | 1/2004 | Mahgerefteh et al. |
| 2004/0008937 A1 | 1/2004 | Mahgerefteh et al. |
| 2004/0036943 A1 | 2/2004 | Freund et al. |
| 2004/0076199 A1 * | 4/2004 | Wipiejewski et al. ......... 372/26 |
| 2004/0081386 A1 | 4/2004 | Morse et al. |
| 2004/0086012 A1 | 5/2004 | Kitaoka et al. |
| 2004/0096221 A1 | 5/2004 | Mahgerefteh et al. |
| 2004/0218890 A1 | 11/2004 | Mahgerefteh et al. |
| 2004/0234200 A1 | 11/2004 | Jennings et al. |
| 2005/0100345 A1 | 5/2005 | Welch et al. |

| | | | |
|---|---|---|---|
| 2005/0111852 A1 | 5/2005 | Mahgerefteh et al. | |
| 2005/0152702 A1 | 7/2005 | Mahgerefteh et al. | |
| 2005/0163512 A1 | 7/2005 | Tayebati et al. | |
| 2005/0169638 A1 | 8/2005 | Tayebati et al. | |
| 2005/0169642 A1 | 8/2005 | Mahgerefteh et al. | |
| 2005/0175356 A1 | 8/2005 | McCallion et al. | |
| 2005/0196177 A1 | 9/2005 | Moran | |
| 2005/0206989 A1 | 9/2005 | Marsh | |
| 2005/0213993 A1 | 9/2005 | Kazemi-Nia et al. | |
| 2005/0249509 A1 | 11/2005 | Nagarajan et al. | |
| 2005/0271394 A1 | 12/2005 | Whiteaway et al. | |
| 2005/0286829 A1 | 12/2005 | Mahgerefteh et al. | |
| 2005/0286909 A1 | 12/2005 | Kish et al. | |
| 2006/0002718 A1 | 1/2006 | Matsui et al. | |
| 2006/0008272 A1 | 1/2006 | Abeles et al. | |
| 2006/0018666 A1 | 1/2006 | Matsui et al. | |
| 2006/0029358 A1 | 2/2006 | Mahgerefteh et al. | |
| 2006/0029396 A1 | 2/2006 | Mahgerefteh et al. | |
| 2006/0029397 A1 | 2/2006 | Mahgerefteh et al. | |
| 2006/0078338 A1* | 4/2006 | Johnson et al. | 398/187 |
| 2006/0120416 A1 | 6/2006 | Hu et al. | |
| 2006/0193636 A1 | 8/2006 | Katagiri et al. | |
| 2006/0228120 A9 | 10/2006 | McCallion et al. | |
| 2006/0233556 A1 | 10/2006 | Mahgerefteh et al. | |
| 2006/0239306 A1 | 10/2006 | Donanhoe | |
| 2006/0274993 A1 | 12/2006 | Mahgerefteh et al. | |
| 2007/0286608 A1 | 12/2007 | Matsui et al. | |
| 2008/0002990 A1 | 1/2008 | McCallion et al. | |
| 2008/0037608 A1 | 2/2008 | Zhou et al. | |
| 2008/0159747 A1 | 7/2008 | Mahgerefteh et al. | |
| 2008/0166134 A1 | 7/2008 | McCallion et al. | |
| 2008/0181619 A1 | 7/2008 | Heismann | |
| 2008/0187325 A1 | 8/2008 | McCallion et al. | |
| 2008/0193132 A1 | 8/2008 | Matsui et al. | |
| 2008/0240180 A1 | 10/2008 | Matsui et al. | |
| 2008/0247763 A1 | 10/2008 | Mahgerefteh et al. | |
| 2008/0247765 A1 | 10/2008 | Mahgerefteh et al. | |
| 2008/0291950 A1 | 11/2008 | McCallion et al. | |
| 2009/0003842 A1 | 1/2009 | Mahgerefteh et al. | |
| 2009/0060526 A1 | 3/2009 | Matsui et al. | |
| 2009/0080905 A1 | 3/2009 | Olsson | |
| 2009/0196631 A1 | 8/2009 | Daghighian et al. | |
| 2009/0238224 A1 | 9/2009 | Ye | |
| 2009/0269069 A1 | 10/2009 | Mahgerefteh et al. | |
| 2010/0008679 A1 | 1/2010 | Cole | |
| 2010/0098436 A1 | 4/2010 | Mahgerefteh et al. | |
| 2010/0279447 A1 | 11/2010 | Matsui et al. | |
| 2010/0311195 A1 | 12/2010 | Matsui et al. | |

FOREIGN PATENT DOCUMENTS

| | | |
|---|---|---|
| CN | 200580037807 | 5/2010 |
| EP | 0524758 | 7/1992 |
| EP | 602659 | 6/1994 |
| EP | 05764209.2 | 6/2009 |
| GB | 2 107 147 | 4/1983 |
| JP | 58-075340 | 5/1983 |
| JP | 62-189832 | 8/1987 |
| JP | 09-214427 | 8/1997 |
| JP | 11-031859 | 2/1999 |
| JP | 2000105313 | 4/2000 |
| JP | 2001-036477 | 2/2001 |
| JP | 2001-284711 | 10/2001 |
| JP | 2001291928 | 10/2001 |
| JP | 2001320328 | 11/2001 |
| JP | 2002243935 | 8/2002 |
| JP | 2002267834 | 9/2002 |
| JP | 2002267998 | 9/2002 |
| JP | 2002-311235 | 10/2002 |
| WO | WO9905804 | 2/1999 |
| WO | WO0104999 | 1/2001 |
| WO | WO 0117076 | 3/2001 |
| WO | WO 0118919 | 3/2001 |
| WO | WO03005512 | 1/2003 |

OTHER PUBLICATIONS

CN 200580015245.0, Sep. 25, 2009, Office Action.
CN 200580015245.0, Mar. 29, 2010, Office Action.
CN 200880009551.7, Jul. 14, 2010, Office Action.
EP 05731268.8, Jan. 16, 2008, Office Action.
EP 05731268.8, Mar. 12, 2010, Office Action.
KR 102008-7027139, Apr. 28, 2010, Office Action.
JP 2009-504345, Apr. 27, 2010, Office Action.
JP2004-551835, Jul. 18, 2008, Office Action.
JP2004-551835, Mar. 2, 2010, Office Action.
CN 200380108289.9, Nov. 23, 2007, Office Action.
CN 200380108289.9, Aug. 29, 2008, Office Action.
CN 200380108289.9, Nov. 21, 2008, Office Action.
CA 2510352, Mar. 17, 2010, Office Action.
Alexander et al., Passive Equalization of Semiconductor Diode Laser Frequency Modulation, Journal of Lightwave Technology, Jan. 1989, 11-23, vol. 7, No. 1.
Binder, J. et al., 10 Gbit/s—Dispersion Optimized Transmission at 1.55 um Wavelength on Standard Single Mode Fiber, IEEE Photonics Technology Letters, Apr. 1994, 558-560, vol. 6, No. 4.
Chang-Hee Lee et al, Transmission of Directly Modulated 2.5—Gb/s Signals Over 250 km of Nondispersion-Shifted Fiber by Using a Spectral Filtering Method, IEEE Photonics Technology Letters, vol. 8, No. 12 Dec. 1996 pp. 1725-7127.
Dischler, Roman, Buchali, Fred, Experimental Assessment of a Direct Detection Optical OFDM System Targeting 10Gb/s and Beyond, Optical Fiber Communication/National Fiber Optic Engineers Conference, Feb. 24-28, 3 pages, San Diego, CA.
Hyryniewicz, J.V., et al., Higher Order Filter Response in Coupled Microring Resonators, IEEE Photonics Technology Letters, Mar. 2000, 320-322, vol. 12, No. 3.
Dong Jae Shin, et al., Low-cost WDM-PON with Colorless Bidirectional Tranceivers, Journal of Lightwave Technology, Jan. 2006, pp. 158-165, vol. 24, No. 1.
Kikuchi, Nobuhiko, et al., Experimental Demonstration of Incoherent Optical Multilevel Staggered-APSK (Amplitude- and Phase-Shift Keying) Signaling, Optical Fiber Communication/National Fiber Optic Engineers Conference, Feb. 24-28, 2008, 3 pages, San Diego, CA.
Kiyoshi Fukuchi, Proposal and Feasibility Study of a 6-level PSK modulation format based system for 100 Gg/s migration, 2007, 3 pages.
Koch, T. L. et al., Nature of Wavelength Chirping in Directly Modulated Semiconductor Lasers, Electronics Letters, Dec. 6, 1984, 1038-1039, vol. 20, No. 25/26.
Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.
Lammert et al., MQW DBR Lasers with Monolithically Integrated External-Cavity Electroabsorption Modulators Fabricated Without Modification of the Active Region, IEEE Photonics Technology Letters, vol. 9, No. 5, May 1997, pp. 566-568.
Li, Yuan P., et al., Chapter 8: Silicon Optical Bench Waveguide Technology, Optical Fiber Communications, 1997, 319-370, vol. 111B, Lucent Technologies, New York.
Little, Brent E., Advances in Microring Resonators, Integrated Photonics Research Conference 2003.
Mahgerefteh, D. and Fan, F., Chirp-managed-laser technology delivers >250-km reach, Lightwave Online, 2005, PennWell Corporation. Accessed online Jul. 1, 2009 at: http://www.finisar.com/download_31wMeaCML_Application%20White%20Paper-LW.pdf.
Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.
Morton, P.A. et al., "38.5km error free transmission at 10Gbit/s in standard fibre using a low chirp, spectrally filtered, directly modulated 1.55um DFB laser", Electronics Letters, Feb. 13, 1997, vol. 33(4).
Prokais, John G., Digital Communications, 2001, 202-207, Fourth Edition, McGraw Hill, New York.
Rasmussen, C.J., et al., Optimum Amplitude and Frequency-Modulation in an Optical Communication System Based on Dispersion Supported Transmission, Electronics Letters, Apr. 27, 1995, 746, vol. 31, No. 9.

Ronald Freund, Dirk Daniel Gross, Matthias Seimetz, Lutz Molle, Christoph Casper, 30 Gbit/s RZ 8-PSK Transmission over 2800 km Standard Single Mode Fibre without Inline Dispersion Compensation, 2007, 3 pages.

Shalom, Hamutal et al., On the Various Time Constants of Wavelength Changes of a DFB Laser Under Direct Modulation, IEEE Journal of Quantum Electronics, Oct. 1998, pp. 1816-1822, vol. 34, No. 10.

Tokle, Torger et al., Advanced Modulation Formats for Transmission Systems, Optical Fiber Communication/National Fiber Optic Engineers Conference, Feb. 24-28, 2008, 3 pages, San Diego, CA.

Wedding, B., Analysis of fibre transfer function and determination of receiver frequency response for dispersion supported transmission, Electronics Letters, Jan. 6, 1994, 58-59, vol. 30, No. 1.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Yu, et al., Optimization of the Frequency Response of a Semiconductor Optical Amplifier Wavelength Converter Using a Fiber Bragg Grating, Journal of Lightwave Technology, Feb. 1999, 308-315, vol. 17, No. 2.

Corvini, P.J. et al., Computer Simulation of High-Bit-Rate Optical Fiber Transmission Using Single-Frequency Lasers, Journal of Lightwave Technology, Nov. 1987, 1591-1596, vol. LT-5, No. 11.

Matsui, Yasuhiro et al, Chirp-Managed Directly Modulated Laser (CML), IEEE Photonics Technology Letters, Jan. 15, 2006, pp. 385-387, vol. 18, No. 2.

Nakahara, K. et al, 40-Gb/s Direct Modulation With High Extinction Ratio Operation of 1.3- μm InGaAlAs Multiquantum Well Ridge Waveguide Distributed Feedback Lasers, IEEE Photonics Technology Letters, Oct. 1, 2007, pp. 1436-1438, vol. 19 No. 19.

Sekine, Kenro, et al., Advanced Multi-level Transmission Systems, Optical Fiber Communication/National Fiber Optic Engineers Conference, Feb. 24-28, 2008, 3 pages, San Diego, CA.

Sato, K. et al, Chirp Characteristics of 40-Gb/s Directly Modulated Distributed-Feedback Laser Diodes, Journal of Lightwave Technology, Nov. 2005, pp. 3790-3797, vol. 23, No. 11.

U.S. Appl. No. 11/964,315, Aug. 25, 2010, Office Action.
U.S. Appl. No. 11/964,321, Aug. 25, 2010, Office Action.
U.S. Appl. No. 12/115,337, Mar. 4, 2010, Office Action.
U.S. Appl. No. 12/115,337, Aug. 20, 2010, Office Action.
U.S. Appl. No. 12/047,017, Jun. 1, 2010, Restriction Requirement.
U.S. Appl. No. 12/047,017, Aug. 6, 2010, Office Action.
U.S. Appl. No. 12/053,344, Sep. 3, 2010, Notice of Allowance.

Mahgerefteh et al., Chirp managed laser (CML): A compact transmitter for dispersion tolerant 10 Gb/s networking applications; Optical Fiber Communication Conference, 2006 and the 2006 National Fiber Optic Engineers Conference. OFC 2006, Mar. 5-10, 2006; Digital Object Identifier: 10.1109/OFC.2006.215459.

Wesstrom et al., State-of-the-art performance of widely tunable modulated grating Y-branch lasers; Optical Fiber Communication Conference, 2004. OFC 2004, vol. 1, no., pp. 2 vol. (1800), Feb. 23-27, 2004; doi: 10.1109/OFC.2004.1349295.

JP 2009-504345, Oct. 26, 2010, Office Action.
U.S. Appl. No. 12/014,676, Oct. 4, 2010, Office Action.
U.S. Appl. No. 12/017,957, Nov. 5, 2010, Office Action.
U.S. Appl. No. 12/025,573, Oct. 6, 2010, Office Action.
U.S. Appl. No. 12/028,675, Oct. 27, 2010, Office Action.
U.S. Appl. No. 12/047,017, Sep. 27, 2010, Notice of Allowance.
U.S. Appl. No. 12/053,344, Apr. 1, 2010, Office Action.
U.S. Appl. No. 12/115,337, Oct. 28, 2010, Notice of Allowance.
U.S. Appl. No. 12/184,137, Dec. 2, 2010, Notice of Allowance.

* cited by examiner

US 8,027,593 B2

SLOW CHIRP COMPENSATION FOR ENHANCED SIGNAL BANDWIDTH AND TRANSMISSION PERFORMANCES IN DIRECTLY MODULATED LASERS

CROSS-REFERENCE TO RELATED APPLICATIONS

The present application claims the benefit of priority of U.S. Provisional Patent Application Ser. No. 60/900,386, entitled METHODS AND APPARATUS OF SLOW CHIRP COMPENSATION FOR ENHANCED SIGNAL BANDWIDTH AND TRANSMISSION PERFORMANCES IN DIRECTLY MODULATED LASERS, filed Feb. 8, 2007, and fully incorporated herein by reference in its entirety.

BACKGROUND OF THE INVENTION

1. The Field of the Invention

The present invention relates generally to directly modulated lasers. More particularly, embodiments of the invention relate to methods and systems for compensating slow chirp in the frequency chirp modulation response of directly modulated lasers.

2. The Relevant Technology

Fiber optic communication systems use a variety of transmitters to convert electrical digital bits of information into optical signals that are sent through optical fibers. On the other end of the optical fiber is a receiver that converts the optical signal to an electrical signal. The transmitters modulate the signals to form bits of 1s and 0s so that information or data may be carried through the optical fiber. There are a variety of transmitters that modulate the signal in different ways. For example, there are directly modulated transmitters and indirectly modulated transmitters. Directly modulated transmitters offer a compact system having large response to modulation and are integratable. Directly modulated transmitters are also generally less expensive than externally modulated transmitters, which require an intensity modulator, usually $LiNbO_3$, following the laser.

One of the drawbacks of a directly modulated transmitter is that its output is highly chirped. Chirp is the rapid change in optical frequency or phase that accompanies an intensity modulated signal. Chirped pulses become distorted after propagation through tens of kilometers of dispersive optical fiber, increasing system power penalties to unacceptable levels. There are various types of chirp exhibited by directly modulated transmitters, including transient chirp, adiabatic chirp, and slow chirp. Slow chirp generates a low frequency roll-off in the frequency modulation response of directly modulated transmitters and slows rise and fall time of emitted optical signals in the time domain. Slow chirp is generally attributed to intrinsic physical properties of the transmitter, such as carrier transport and spatial hole burning.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF THE INVENTION

These and other limitations are overcome by embodiments of the invention which relate to systems and methods for compensating slow chirp in directly modulated transmitters. Slow chirp compensation according to embodiments of the invention can be implemented electrically, optically, or any combination thereof. Advantageously, slow chirp compensation reduces and/or eliminates the impairment of various optical performances cause by slow chirp, including jitter, eye mask margin, receiver sensitivity, dispersion tolerance, and the like or any combination thereof.

According to one embodiment of the invention, an optical transmitter with slow chirp compensation includes an optical signal source (e.g., a semiconductor laser) adapted to be directly modulated and to produce a first signal that is frequency modulated, phase modulated, or both, and slow chirp compensation means for reducing slow chirp in the first signal for improved optical performance. In one embodiment, the slow chirp compensation means include an LR filter or other RF circuit coupled to the optical signal source and a corresponding direct modulation source (such as a laser driver). Alternately or additionally, slow chirp compensation means can include an optical spectrum reshaper ("OSR") with a rounded top and relatively large slope (e.g., 1.5 to 3 dB/GHz). The slow chirp compensation means can be designed based on a desired compensation response derived as explained herein.

According to another embodiment of the invention, a method for reducing slow chirp includes directly modulating an optical light source to generate an optical signal that is frequency modulated and/or phase modulated and then compensating slow chirp in the optical signal by introducing an inverse response of the slow chirp into the optical signal. Prior to directly modulating the optical light source and/or compensating slow chirp, a desired inverse response can be calculated using one or more of the equations described herein. Alternately or additionally, the desired inverse response may be configured to over-compensate, under-compensate, or produce a flat response.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to methods and systems for slow chirp compensation for enhanced signal bandwidth and transmission performances in directly modulated lasers ("DMLs"). Embodiments of the invention further relate to methods for characterizing slow chirp. According to one embodiment of the invention, slow chirp compensation can be implemented electrically using an inductor-resistor ("LR") filter. Alternately or additionally, slow chirp compensation can be implemented optically using an optical spectrum reshaper ("OSR").

Advantageously, embodiments of the invention can free frequency modulated ("FM") or phase modulated ("PM") DMLs from signal degradation due to slow chirp. Further, embodiments of the invention out-perform existing technology solutions in frequency chirp modulation response, jitter, eye mask margin, receiver sensitivity, dispersion tolerance, and compactness.

Embodiments of the present invention can be implemented in various optoelectronic devices. As used herein, the term "optoelectronic device" includes devices having both optical and electrical components. Examples of optoelectronic devices include, but are not limited to transponders, transceivers, transmitters, and/or receivers. Optoelectronic devices can be used, for instance, in telecommunications networks, local area networks, metro area networks, storage area networks, wide area networks, and the like. The principles of the present invention may be implemented in optoelectronic devices of any form factor currently available or that may be developed in the future, including SFF, SFP, SFP+, XFP, X2, and 300-pin, without restriction. It will be appreciated, however, that the optoelectronic devices need not comply with standardized form factor requirements and may have any size or configuration necessary according to a particular design. The principles of the present invention are suitable for 1G, 2G, 4G, 10G and higher bandwidth fiber channels.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

Figure 1:
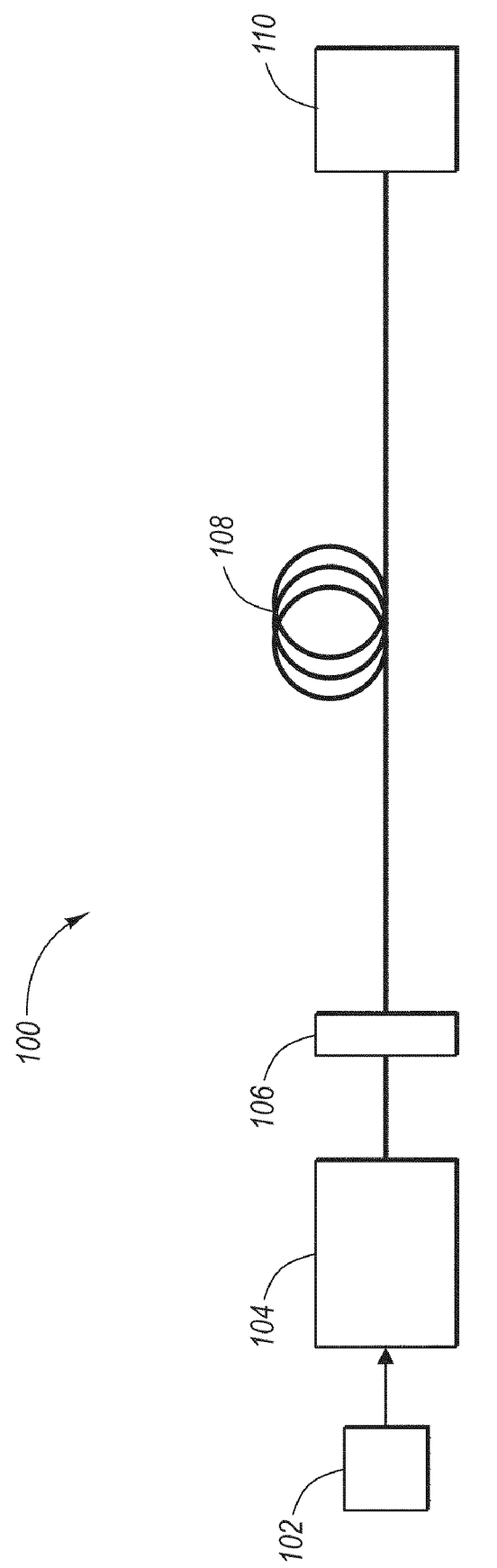
FIG. 1 illustrates an example operating environment in which embodiments of the invention can be implemented.

FIG. 1 illustrates a simplified block diagram of an example fiber optic system 100 in which the principles of the present invention may be employed. While the fiber optic system 100 and its components will be described in some detail, the system 100 and its components are described by way of illustration only, and not by way of restricting the scope of the invention.

The fiber optic system 100 includes a laser driver 102, optical signal source 104, optical spectrum reshaper ("OSR") 106, optical fiber 108, and optical receiver 110. In one embodiment, the optical signal source 104 and OSR 106 are implemented within a transmitter optical subassembly ("TOSA") or other optical transmitter for optical data transmission in an optoelectronic device such as a transceiver or transponder. In this case, the laser driver 102 may be included within the TOSA or external to the TOSA within the optoelectronic device. The optical receiver 110 may be implemented within a receiver optical subassembly ("ROSA") for optical data reception in a different optoelectronic device. Alternately or additionally, the laser driver 102, optical signal source 104, and OSR 106 can be implemented in the TOSA of an optoelectronic device that also includes a ROSA and/or optical receiver to facilitate two-way communication.

The laser driver 102 directly modulates the optical signal source 104 with an electrical signal such that the optical signal source 104 generates a corresponding optical data signal. In this regard, U.S. Pat. No. 6,331,991, entitled HIGH-SPEED TRANSMISSION SYSTEM COMPRISING A COUPLED MULTI-CAVITY OPTICAL DISCRIMINATOR and issued Dec. 18, 2001 is hereby incorporated by reference in its entirety. The optical signal source 104 may comprise, for instance, a semiconductor laser such as a vertical cavity surface emitting laser ("VCSEL"), a distributed feedback ("DFB") laser, a laser diode ("LD"), or the like. In one embodiment, the laser is biased high above threshold and the level of modulation may produce a predetermined extinction ratio, such as about 2 dB to about 7 dB.

The emitted optical data signal may be frequency modulated ("FM") and/or phase modulated ("PM") and can pass through an OSR 106 having a dispersion $D_{OSR}$ in ps/nm. In one embodiment, the emitted optical data signal is passed through one of the transmission edges of the OSR 106. The OSR 106 may convert the FM and/or PM optical data signal to a substantially amplitude modulated ("AM") optical data signal. In this example, the OSR 106 may be a coupled multi-cavity ("CMC") filter (such as an MC etalon filter), a band-pass filter, or the like, to enhance the fidelity of the FM/PM to AM conversion as well as introducing enhanced dispersion compensation to achieve longer reach applications.

The resulting optical data signal from the OSR 106 is transmitted through a fiber 108 having net dispersion $D_{fiber}$ in ps/nm. The OSR 106 may have a predetermined dispersion that is the opposite sign of the dispersion in the fiber (e.g., $D_{OSR}+D_{fiber}=0$) so that the dispersion effect on the fiber may be minimized. This way, the optical data signal may travel further without the signal being distorted due to the dispersion in the fiber. The receiver 110 then detects the optical data signal sent through the fiber 108. When the fiber optic system 100 operates in this manner, the OSR 106 increases the modulation depth of the incoming optical data signal from the light source 104 in the FM/PM to AM conversion, reduces chirp by rejecting part of the spectrum, as well as partially compensating for the dispersion in the fiber.

A fiber optic communication system according to embodiments of the invention additionally includes slow chirp compensation means for reducing and/or eliminating slow chirp in the frequency chirp modulation response of the optical signal, described in greater detail below. Slow chirp compensation means may include one or more of optical compensation (e.g., an OSR 106), electrical compensation (e.g., a compensation circuit between the laser driver 102 and optical signal source 104, as described below), and the like or any combination thereof. Furthermore, embodiments of the invention are not confined to fiber optic communication systems that include an OSR 106, and can alternately or additionally be implemented in conventional fiber optic systems lacking an OSR.

Returning to FIG. 1, and as indicated above, the optical signals emitted by the directly modulated light source 104 may be frequency modulated. Frequency modulation is also referred to as frequency excursion, or chirp, and is exhibited by directly modulated semiconductor lasers. The modulation response of frequency chirp can be characterized by transient chirp, adiabatic chirp, and slow chirp. Transient chirp occurs at 1-to-0 and 0-to-1 bit transitions and is due to relaxation resonance of the laser 104. Transient chirp determines, along with electrical parasitics and optical nonlinearity, the high frequency response of the emitted optical signal (e.g., the high frequency response typically refers to the response at frequencies greater than 5 GHz for lasers directly modulated at data rates of 10 Gb/s and above). The OSR 106 used to reshape the optical spectrum of the emitted optical signal and/or to convert FM/PM to AM also contributes to the high frequency response of the optical signal.

Adiabatic chirp is proportional to optical intensity, causing 1 bits to be blue-shifted relative to 0 bits. Ideally, a flat adiabatic chirp is used to generate FM or PM in the emitted optical signal. Methods and systems relating to the management and manipulation of transient chirp and adiabatic chirp are described in greater detail in the following U.S. patent applications: Ser. No. 11/084,630, entitled FLAT CHIRP INDUCED BY FILTER EDGE, and filed Mar. 18, 2005; and Ser. No. 11/068,032, entitled OPTICAL SYSTEM COMPRISING AN FM SOURCE AND A SPECTRAL RESHAPING ELEMENT, and filed Feb. 28, 2005. The foregoing applications are herein incorporated by reference in their entirety.

Figure 2:
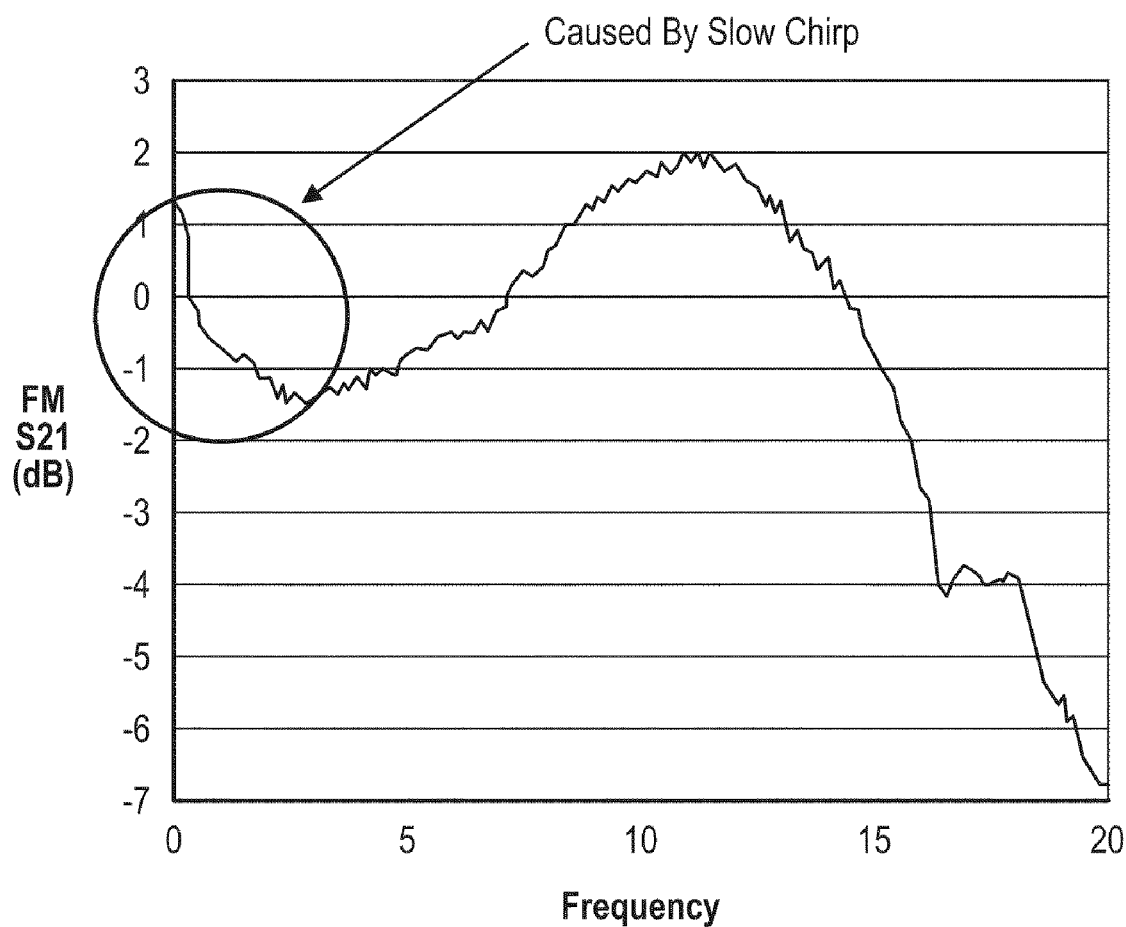
FIG. 2 illustrates a measured frequency response due to slow chirp in the S21 measurement of a directly modulated laser.

Slow chirp is also observed in directly modulated lasers, manifesting as a low frequency roll-off in the frequency modulation response and as slow rise and fall times of the optical signal in the time domain. Slow chirp is attributed to intrinsic physical properties of the optical signal source 104, such as carrier transport and spatial hole burning. One embodiment of a measured frequency response due to slow chirp in the S21 measurement is illustrated in FIG. 2.

According to one embodiment of the invention, the analysis of slow chirp can be simplified by using a small signal model to describe the modulation response of frequency chirp. The frequency chirp can be expressed by the following simplified small signal formula:

$$v_m(f) = A\left(1 + j\frac{2\pi f}{\gamma_{PP}} + \frac{s}{1 + 2\pi j f \tau_s}\right)\frac{f_R^2}{f_R^2 - f^2 + jf\gamma}I_m(f) \quad (1)$$

where $v_m(f)$ is frequency chirp, A is adiabatic chirp, f is modulation frequency, $f_R$ is relaxation frequency, j is the imaginary unit (e.g., $v_m(f)$ may be a complex number), and $\gamma_{PP}$ and $\gamma$ are damping rates. $I_m(f)$ is modulation current and can be derived from modulation voltage $V_m(f)$, as expressed by equation (2):

$$I_m(f) = C(f) V_m(f) \quad (2)$$

where C(f) is the voltage-to-current conversion coefficient and is determined by the driver circuit and package parasitic, which together with relaxation resonance, can have a major impact on the high speed response.

In the present disclosure, slow chirp amplitude s and slow chirp time constant $\tau_s$ have been introduced into equation (1) to characterize the slow chirp. To study the low frequency response where $f<f_R$, the relaxation frequency can be ignored and the frequency chirp $v_m(f)$ can be simplified as shown in equation (3):

$$v_m(f) = A\left(1 + \frac{s}{1 + 2\pi j f \tau_s}\right)I_m(f) \quad (3)$$

Figure 3:
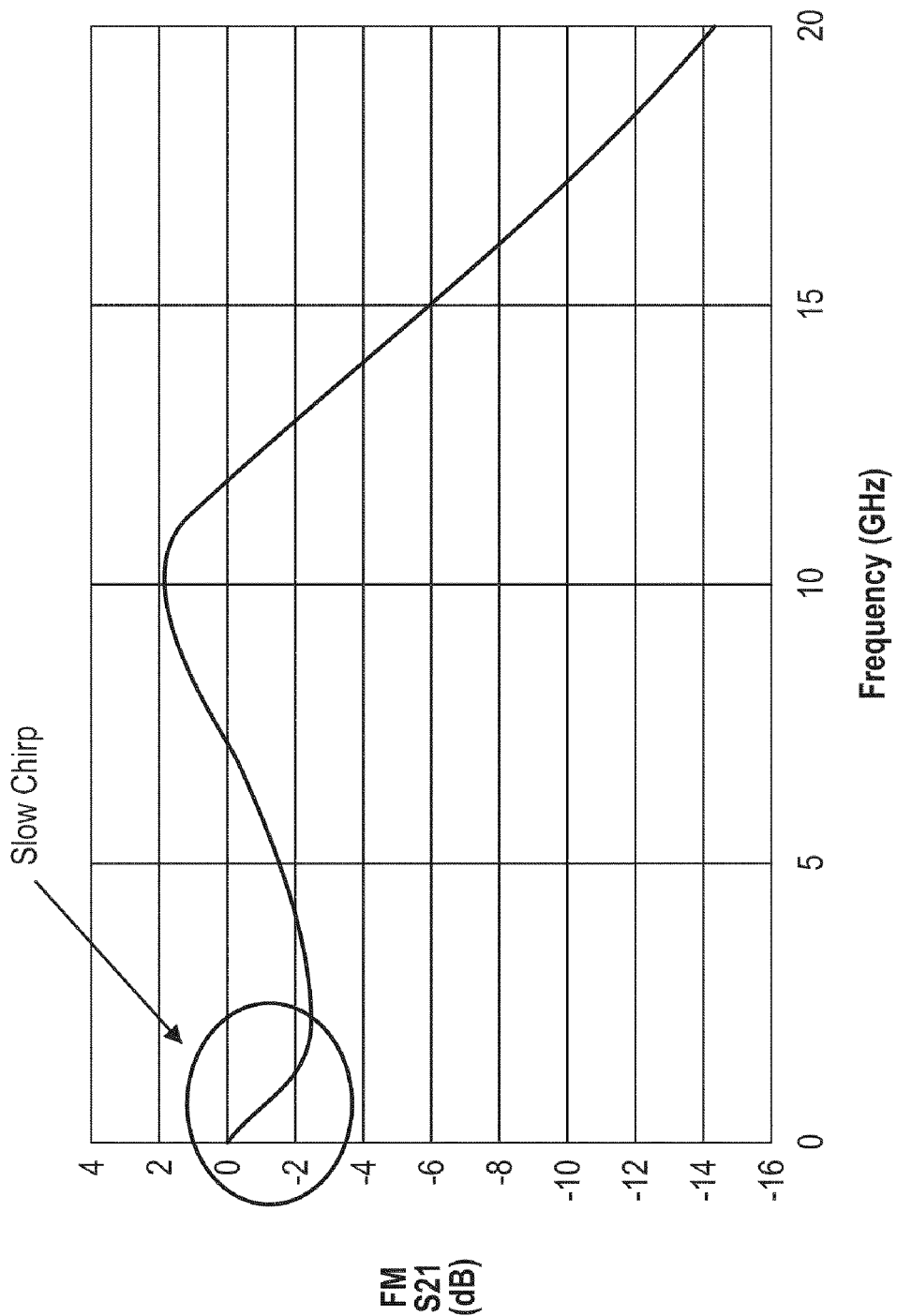
FIG. 3 illustrates a simulated frequency response based on a small signal simulation model described herein.

FIG. 3 graphically simulates frequency chirp $v_m(f)$ as a function of modulation frequency f according to equation (3). The simulation shows that the small signal modulation model of slow chirp described by equation (3) can fit well with the actual slow chirp in the measurements (see FIG. 2).

As previously indicated, slow chirp generates a low frequency roll-off in the frequency modulation response (as shown in FIGS. 2 and 3) and slows rise and fall time of optical signals in the time domain, which can impair optical performance. Accordingly, embodiments of the invention include electrical and/or optical compensation schemes for reducing and/or eliminating slow chirp.

According to one embodiment of the invention, compensation can be realized by introducing an inverse response of the slow chirp to achieve a particular FM modulation response. The particular modulation response $H_r(f)$ can be optimized for optical transmission. The slow chirp response $H_s(f)$ can be achieved by characterizing the laser modulation response as described in equation (3). Then, the slow chirp compensation response used as reshaping the optical spectrum and converting FM/PM to AM modulation $H_c(f)$ can be calculated by solving the following equation (4):

$$H_s(f) \times H_c(f) = k H_r(f) \quad (4)$$

where k is frequency independent and is defined as a compensation coefficient. For passive electrical compensation, the compensation introduces loss in the frequency chirp modulation response, i.e., k<1.

Dependent on the transmission requirements, the slow chirp compensation can be implemented for flat compensation, over compensation, under compensation, and the like or any combination thereof. For flat compensation, $H_r(f)$ can be expressed by:

$$H_r(f) = 1 \quad (5)$$

Based on equation (3), it is assumed that the slow chirp can be expressed by:

$$H_s(f) = 1 + \frac{s}{1 + 2\pi j f \tau_s} \quad (6)$$

Based on equations (4), (5), and (6), the compensation response can be expressed by:

$$H_c(f) = \frac{k}{1 + \frac{s}{1 + 2\pi j f \tau_s}} \quad (7)$$

Therefore, frequency chirp modulation response after compensation can be expressed by:

$$v_m(f) = A k I_m(f) \quad (8)$$

Figure 4:
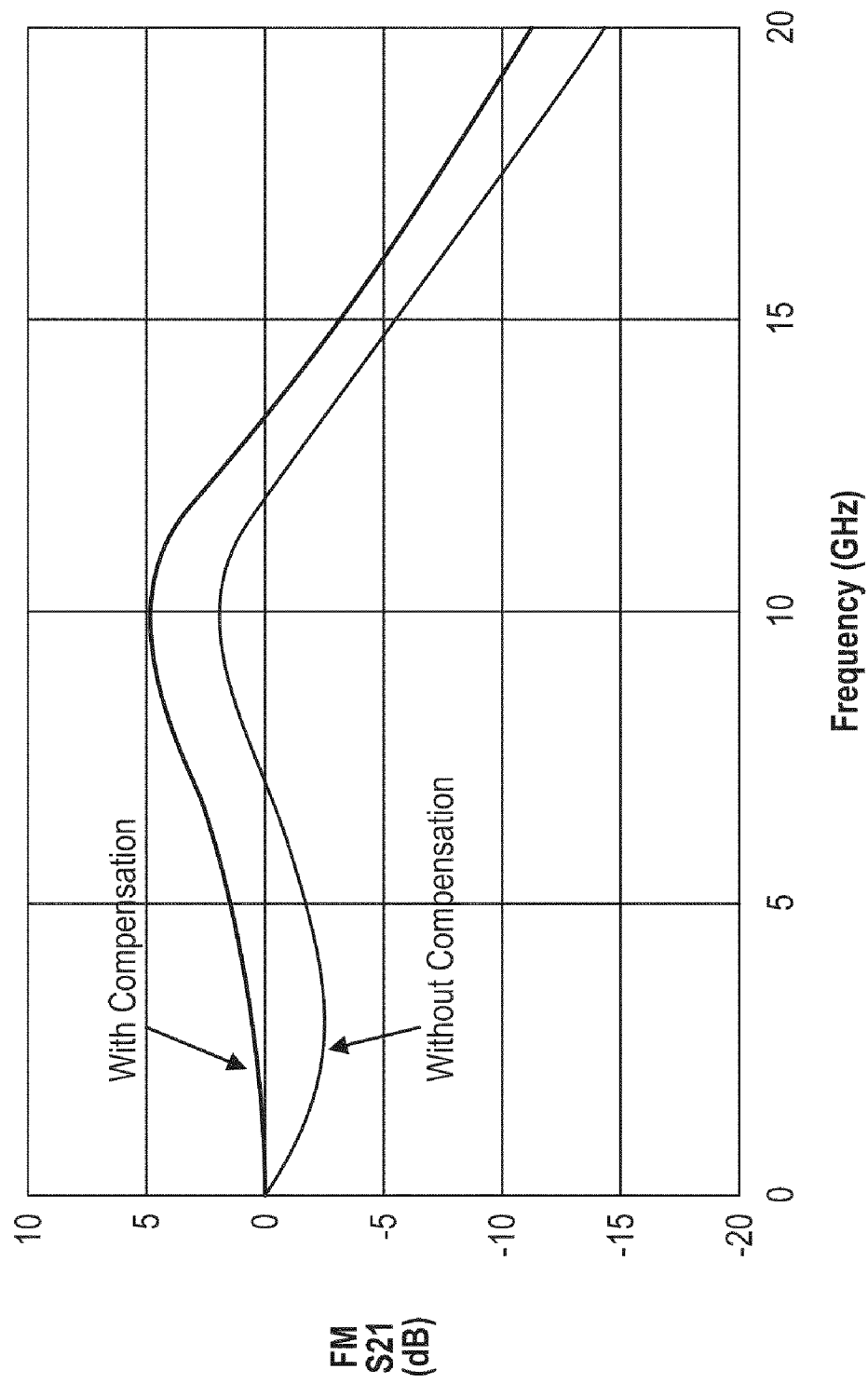
FIG. 4 compares simulated modulation responses for a directly modulated laser with and without slow chirp compensation.

Equation (8) implies that the flat response is achieved by the compensation. As a result, the slow roll-off is eliminated and thus the bandwidth of frequency chirp modulation is enhanced as shown in FIG. 4, which compares the modulation response of a directly modulated laser with and without slow chirp compensation.

Figure 5:
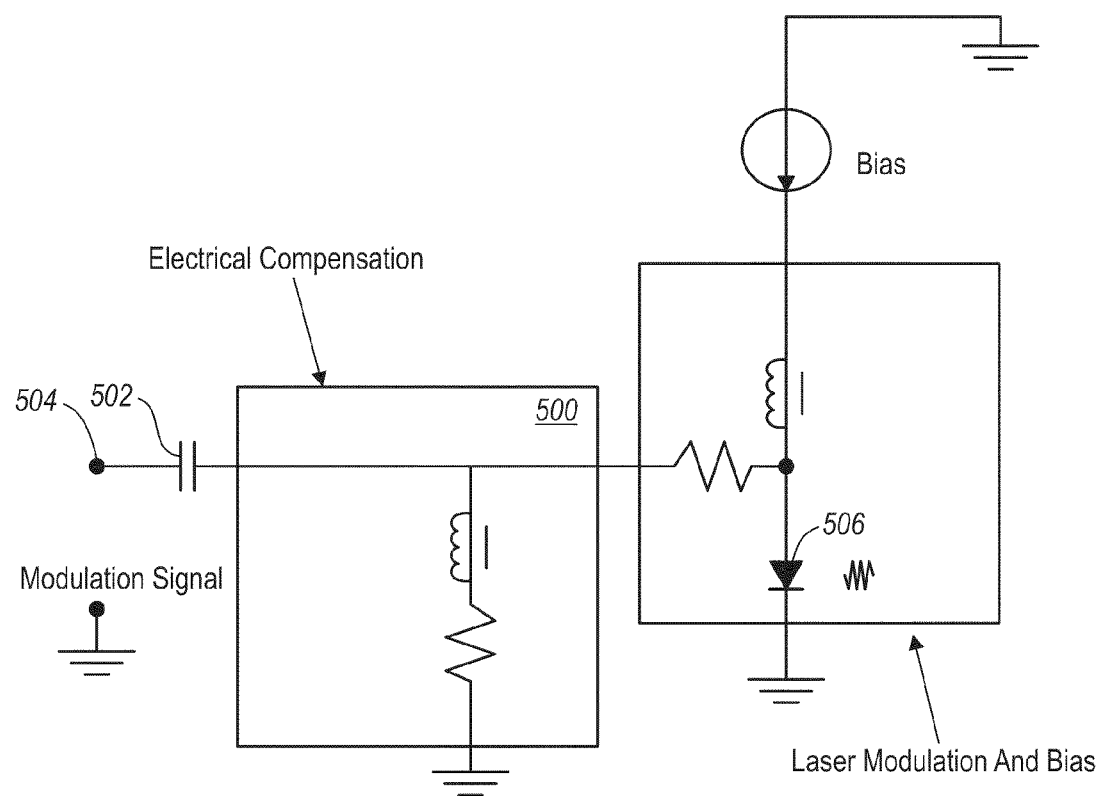
FIG. 5 illustrates an electrical compensation scheme using an LR or other RF filter coupled to a directly modulated laser and corresponding direct modulation source.

Electrical compensation can be achieved by a number of radio frequency ("RF") circuits. For instance, FIG. 5 shows a simplified compensation circuit 500 based on an inductor-resistor ("LR") filter. As shown, the LR filter 500 is AC coupled 502 to direct modulation source 504 (e.g., a laser driver) and is further coupled to optical signal source 506. While the present embodiment 500 implements an LR filter, embodiments of the invention can alternately or additionally, implement other types of slow chirp compensation circuits, including one or more of: a resistor-capacitor ("RC") filter, a resistor-inductor-capacitor ("RLC") filter, or the like or any combination thereof.

Figure 6A:
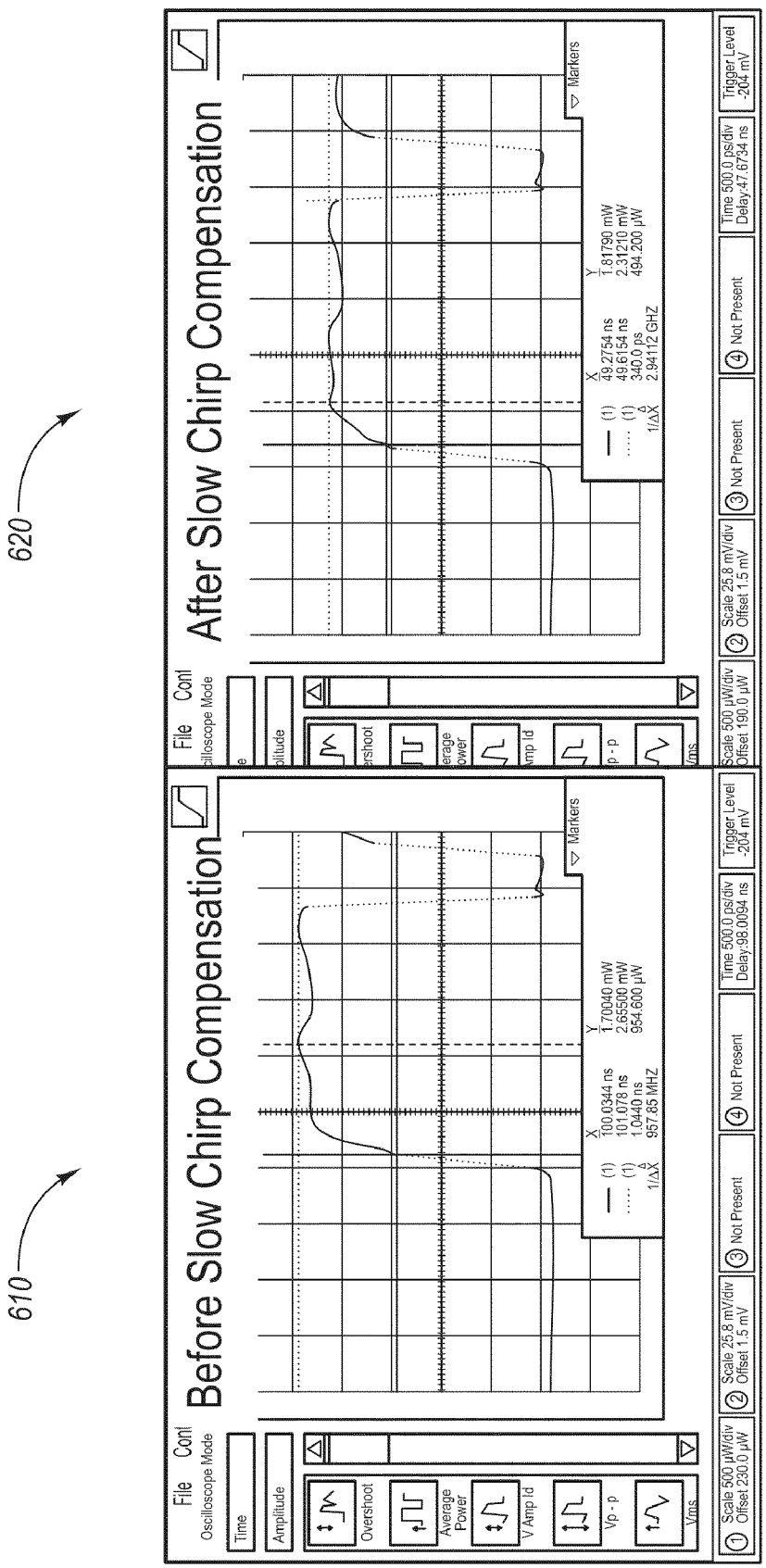
FIGS. 6A-6C illustrate various optical performance parameters with and without slow chirp compensation for a directly modulated laser.
Figure 6B:
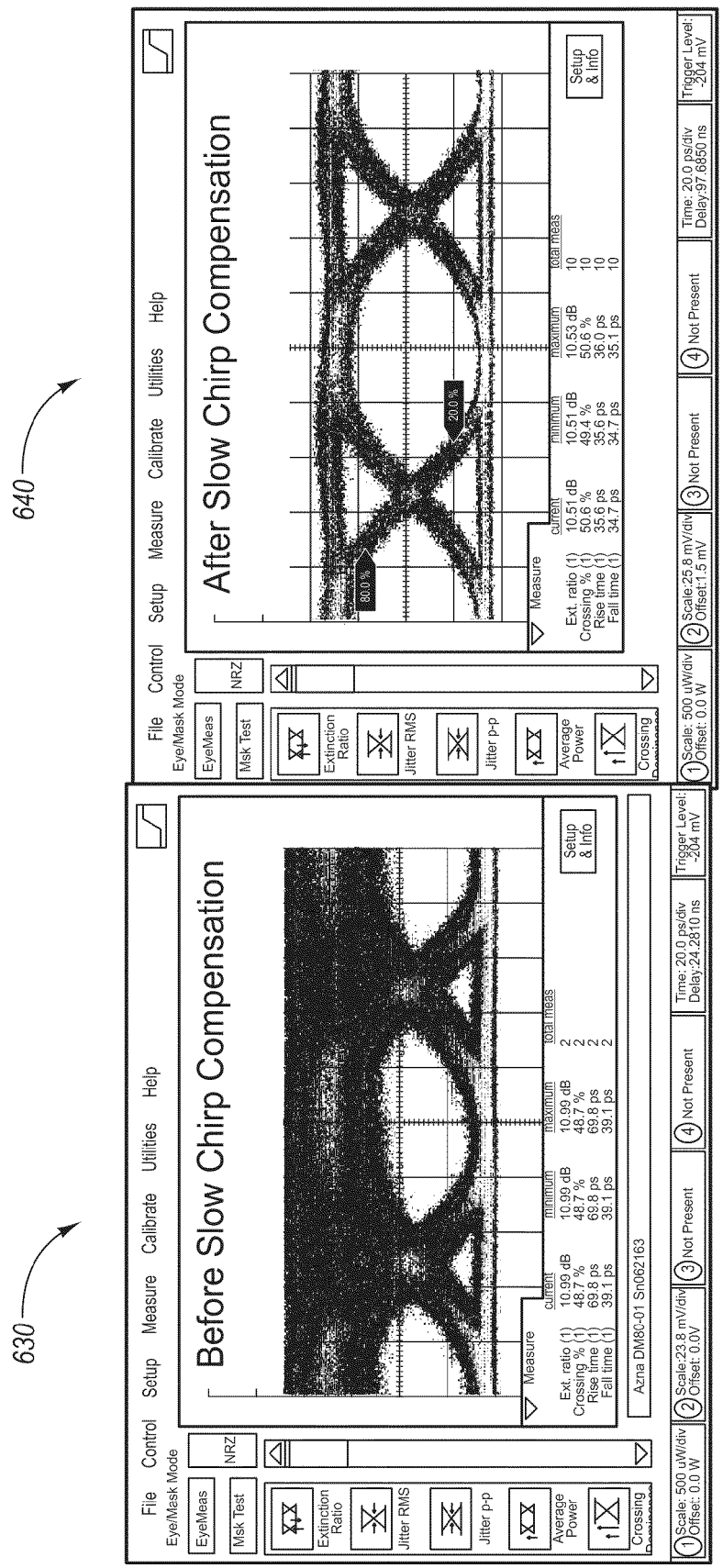
Figure 6C:
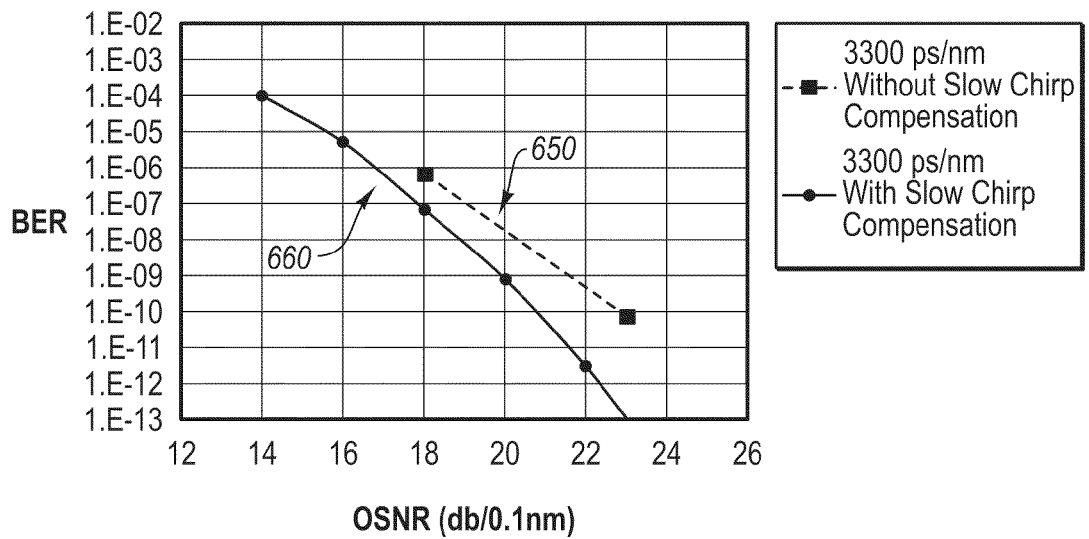

With additional reference to FIGS. 6A-6C, various optical performance measurements with and without slow chirp compensation are provided, illustrating the impact of reducing and/or eliminating slow chirp. For instance, FIG. 6A depicts frequency excursion in the time domain before slow chirp compensation 610 and after slow chirp compensation 620. The graph 620 after slow chirp compensation clearly illustrates a more flat-topped chirp and improved rise and fall times compared to the graph 610 before slow chirp compensation.

FIG. 6B illustrates eye diagrams before slow chirp compensation 630 and after slow chirp compensation 640. As shown in graph 640, the slow chirp compensation greatly improves the eye, reducing jitter and improving rise and fall times.

FIG. 6C depicts bit error rate ("BER") versus optical signal to noise ratio ("OSNR") without slow chirp compensation at 650, and with slow chirp compensation at 660, both experiencing 3300 ps/nm dispersion. As shown, the receiver sensitivity is significantly improved by providing slow chirp compensation.

In summary then, and as illustrated in FIGS. 6A-6C, the impact of slow chirp can be reduced and/or eliminated by providing slow chirp compensation, which significantly improves the frequency chirp modulation response, jitters, eye-masks, receiver sensitivity and dispersion tolerance.

Although slow chirp compensation has been discussed thus far in the context of the flat response, one skilled in the art will appreciate, with the benefit of the present disclosure, that over-compensation and under-compensation can also be useful to improve the transmission performances, dependent on the transmission requirements. For example, over-compensation may generate an over shoot which will further increase modulation bandwidth. The increased bandwidth may partially compensate bandwidth reduction from an OSR. As indicated previously, in fiber optic communication systems according to embodiments of the invention, the bandwidth and slope of an OSR may be important for high dispersion tolerance with FM/PM modulated schemes.

While slow chirp compensation can be provided using an electrical compensation scheme as discussed above, alternately or additionally slow chirp can be compensated by an OSR. In this case, the slope and bandwidth of the OSR can be optimized for both slow chirp compensation and dispersion tolerance. As a result, the optical performances can be improved. In one embodiment, an OSR with a rounded top and relatively large slope (e.g., 1.5 to 3 dB/GHz) can be used in this application. When the wavelength of the input signal is close to the top of the OSR, the slow chirp part of the input FM/PM modulated signal will be flattened. In other words, the OSR performs a kind of regeneration function.

Figure 7:
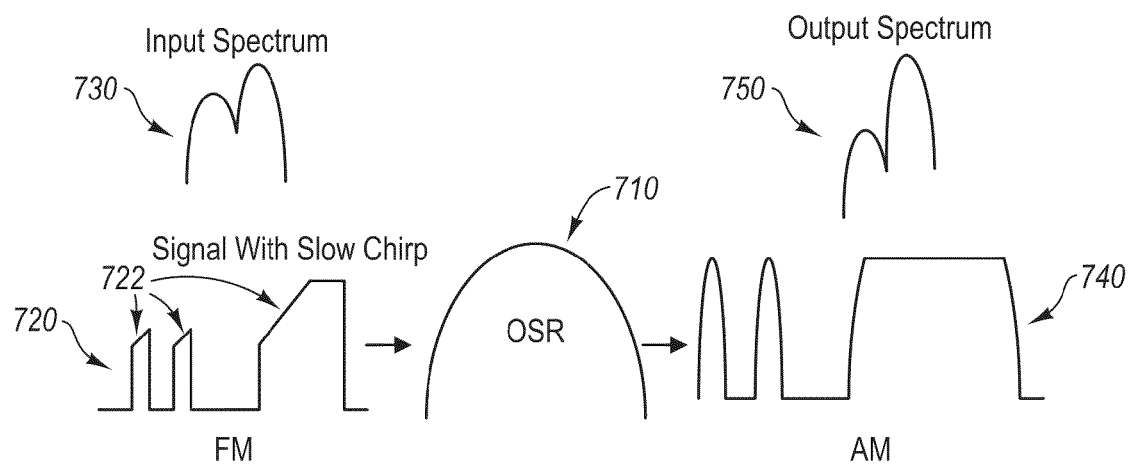
FIG. 7 illustrates an optical compensation scheme using an optical spectrum reshaper following a directly modulated laser.

For instance, FIG. 7 depicts slow chirp compensation using an OSR 710. The OSR 710 receives a frequency modulated input signal 720 from an optical signal source, the input signal 720 having input spectrum 730. The input signal 720 passes through the transmission edge of the OSR 710, thereby enhancing the extinction ratio of the output signal 740, as shown by the output spectrum 750, and converting the frequency modulation to amplitude modulation. As shown, the low frequency roll-off 722 of the input frequency modulated signal 720 disappears in the resulting amplitude modulated output signal 740.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical transmitter with slow chirp compensation, comprising:
    an optical signal source adapted to be directly modulated and to produce a first signal, the first signal being frequency modulated, phase modulated, or both; and slow chirp compensation means for introducing an inverse response of the slow chirp into the first signal;

wherein frequency chirp of the optical signal source is modeled by the formula:

$$v_m(f) = A\left(1 + \frac{s}{1 + 2\pi j f \tau_s}\right) I_m(f);$$

where:
$v_m(f)$ is frequency chirp;
A is adiabatic chirp;
s is slow chirp amplitude;
j is the imaginary unit;
f is modulation frequency;
$\tau_s$ is slow chirp time constant; and
$I_m(f)$ is modulation current.

2. The optical transmitter of claim 1, wherein the slow chirp compensation means includes one or more of electrical compensation and optical compensation.

3. The optical transmitter of claim 2, wherein electrical compensation includes a filter coupled to the optical signal source and to a laser driver configured to directly modulate the optical signal source, the filter including one or more of: an inductor-resistor filter, a resistor-capacitor filter, and a resistor-inductor-capacitor filter.

4. The optical transmitter of claim 2, wherein optical compensation includes an optical spectrum reshaper adapted to reshape the first signal into a second signal, the second signal being amplitude modulated and frequency modulated.

5. The optical transmitter of claim 4, wherein slope and bandwidth of the optical spectrum reshaper are selected to configure the optical spectrum reshaper to provide both slow chirp compensation and dispersion tolerance.

6. The optical transmitter of claim 4, wherein the optical spectrum reshaper includes a rounded top and a slope in the range of 1.5 dB/GHz to 3 dB/GHz.

7. The optical transmitter of claim 1, wherein the optical signal source is a directly modulated semiconductor laser.

8. The optical transmitter of claim 7, wherein slow chirp in the first signal results from intrinsic properties of the directly modulated semiconductor laser, including one or more of carrier transport and spatial hole burning.

9. The optical transmitter of claim 7, wherein the optical signal source is a distributed feedback laser.

10. A method for reducing slow chirp, comprising:
directly modulating an optical light source to generate an optical signal that is frequency modulated, phase modulated, or both;
compensating slow chirp in the optical signal by introducing an inverse response of the slow chirp into the optical signal; and
prior to directly modulating the optical light source, modeling frequency of the optical light source according to the formula:

$$v_m(f) = A\left(1 + \frac{s}{1 + 2\pi j f \tau_s}\right) I_m(f);$$

where:
$v_m(f)$ is frequency chirp;
A is adiabatic chirp;
s is slow chirp amplitude;
j is the imaginary unit;
f is modulation frequency;
$\tau_s$ is slow chirp time constant; and
$I_m(f)$ is modulation current.

11. The method of claim 10, further comprising, prior to compensating slow chirp, calculating the inverse response of the slow chirp using the equation of claim 11.

12. The method of claim 11, wherein the calculated inverse response of the slow chirp is modeled using the following equation:

$$H_c(f) = \frac{k}{1 + \frac{s}{1 + 2\pi j f \tau_s}};$$

wherein:
$H_c(f)$ is the calculated inverse response of the slow chirp; and
k is a frequency independent compensation coefficient.

13. The method of claim 12, wherein compensating slow chirp in the optical signal includes providing passive electrical slow chirp compensation, and wherein the value of k is less than 1.

14. The method of claim 10, wherein compensating slow chirp in the optical signal includes introducing an inverse response of the slow chirp into the optical signal electrically by a radio frequency circuit coupled between the optical light source and a direct modulation source.

15. The method of claim 10, further comprising converting frequency modulation, phase modulation, or both, of the optical signal to amplitude modulation of the optical signal using an optical spectrum reshaper following the optical light source, wherein the optical spectrum reshaper is configured to optically introduce an inverse response of the slow chirp into the optical signal.

16. The method of claim 10, wherein the inverse response of the slow chirp is configured to over-compensate or under-compensate slow chirp.

17. The method of claim 16, wherein the introduction of an inverse response of the slow chirp is performed by an optical spectrum reshaper that reduces bandwidth of the optical signal, and wherein over-compensation of slow chirp generates over shoot that partially compensates the bandwidth reduction from the optical spectrum reshaper.

18. The method of claim 10, wherein compensating slow chirp improves one or more of:
frequency chirp modulation response of the optical signal;
jitter of the optical signal;
eye mask margin of the optical signal;
receiver sensitivity to the optical signal; and
dispersion tolerance of the optical signal,
compared to not compensating slow chirp.

19. The optical transmitter of claim 4, wherein the optical spectrum reshaper includes a coupled multi-cavity filter or a bandpass filter.

* * * * *